United States Patent [19]

Tillinghast

[11] 4,327,058
[45] Apr. 27, 1982

[54] CAPILLARY PROCESSING UNIT

[75] Inventor: John A. Tillinghast, North Hampton, N.H.

[73] Assignee: Wheelabrator-Frye, Inc., Hampton, N.H.

[21] Appl. No.: 167,159

[22] Filed: Jul. 8, 1980

[51] Int. Cl.³ .................. B01J 3/02; B01J 3/04; B01J 8/02; C10G 1/00
[52] U.S. Cl. .................. 422/232; 422/208; 422/211; 422/242
[58] Field of Search .............. 422/208, 211, 242, 232; 137/597, 599, 561 A; 55/189

[56] References Cited

U.S. PATENT DOCUMENTS

| | | | |
|---|---|---|---|
| Re. 25,770 | 4/1965 | Johanson | 208/10 |
| 1,685,488 | 9/1928 | Huff | 208/128 |
| 2,813,700 | 11/1957 | Schenck | 137/599 |
| 3,018,241 | 1/1962 | Gorin | 208/8 R |
| 3,075,912 | 1/1963 | Eastman et al. | 208/8 R |
| 3,117,921 | 1/1964 | Gorin | 208/8 R |
| 3,211,135 | 10/1965 | Grimes et al. | |
| 3,475,317 | 10/1969 | Huntington | 208/8 R |
| 3,488,279 | 1/1970 | Schulman | |
| 3,519,555 | 7/1970 | Keith et al. | 208/8 R |
| 3,540,995 | 11/1970 | Wolk et al. | |
| 3,617,474 | 11/1970 | Stotler et al. | 208/8 R |
| 3,640,816 | 2/1972 | Bull et al. | |
| 3,645,885 | 2/1972 | Harris et al. | 208/10 |
| 3,717,176 | 2/1973 | Smith | 137/599 |
| 3,886,971 | 6/1975 | Lundsgaard et al. | 137/599 |
| 3,960,701 | 6/1976 | Schroeder | 208/8 R |
| 3,962,070 | 6/1976 | Stotler | |
| 4,030,523 | 6/1977 | Cram et al. | 137/599 |
| 4,046,158 | 9/1977 | Hayashi et al. | 136/88 |
| 4,125,452 | 11/1978 | Effron | 208/10 |
| 4,152,244 | 5/1979 | Raichle et al. | 208/8 R |
| 4,162,956 | 7/1979 | Rhodes | 208/8 LE |
| 4,169,128 | 9/1979 | Sinor et al. | 422/224 |

OTHER PUBLICATIONS

"Inside D.O.E.", p. 9, McGraw-Hill, Nov. 9, 1979.
Hellwig et al., "Make Liquid Fuels from Coal," API Report: Hydrocracking, pp. 165-169, May 1966, vol. 45, No. 5.

Primary Examiner—Bradley Garris
Attorney, Agent, or Firm—Schuyler, Banner, Birch, McKie & Beckett

[57] ABSTRACT

A system for the manufacture of synthetic hydrocarbon products from coal or similar carbonaceous solids is described. This coal liquefaction system includes means for reducing the pressure of high pressure and temperature liquid reaction product streams without attendant corrosion of the metal parts in the pressure reducing unit. The pressure reducing means comprises at least one elongated tube defining relatively narrow fluid flow passage, the reduction in pressure being effected substantially entirely by friction of the fluid within the tube.

6 Claims, 1 Drawing Figure

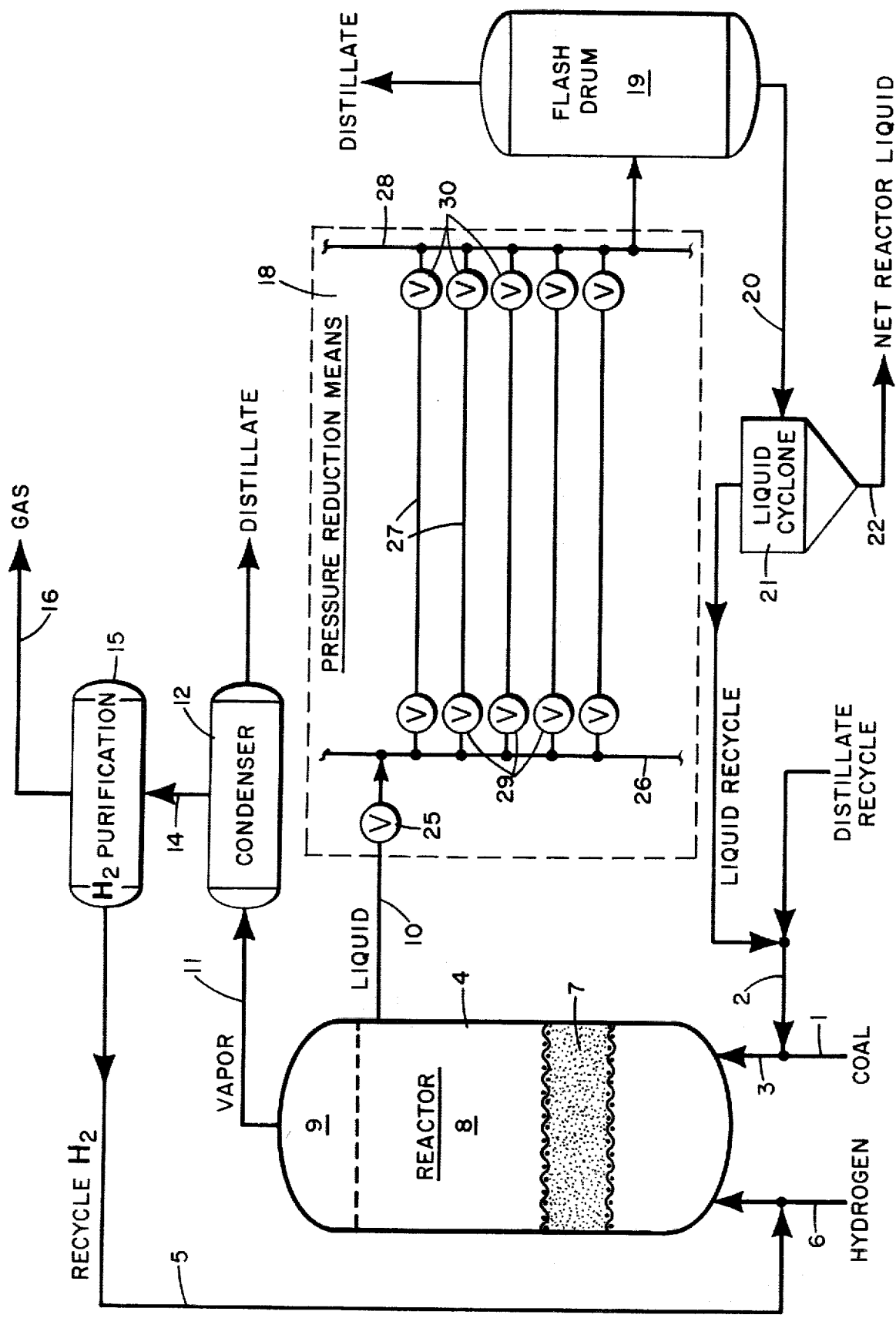

CAPILLARY PROCESSING UNIT

BACKGROUND OF THE INVENTION

1. Field of the Invention

This invention relates to the manufacture of synthetic hydrocarbon products from coal and similar carbonaceous solids and is particularly concerned with overcoming corrosion problems of the pressure reducing systems used in these processes.

2. Description of the Prior Art

Processes for the production of synthetic hydrocarbon products by liquefaction or gasification of coal and similar carbonaceous solids normally require direct contacting of the solid feed material with molecular hydrogen at elevated temperatures and pressure, with or without catalysts, to break down complex high molecular weight starting material into lower molecular weight hydrocarbon liquids and gases. There are numerous methods of coal liquefaction which achieve this result through different means. Over 170 such processes for the manufacture of synthetic hydrocarbon products from coal are described in "Oil from Coal" by Francis W. Richardson, Noyes Data Corporation (1975). Among these experimental processes being investigated, three liquefaction processes are in the more advanced stages of evaluation and show commercial promise: (1) the Solvent Refined Coal (SRC) process, (2) the Donor Solvent process and (3) the H-coal process. These processes are currently being scaled up from pilot plant to demonstration or semi-commercial plant size.

U.S. Pat. No. 3,640,816 to Bull and Schmid describes the Solvent Refined Coal (SRC) process as a multiple-stage non-catalytic hydrogenation process for producing light liquids from coal in which a slurry of pulverized coal, a solvent therefor and hydrogen are charged under pressure into a first reaction zone where the temperature is elevated and maintained until substantially all of the coal is dissolved. Gases and light liquids produced by partial hydrogenation of the reaction products are separated from the heavy bottoms and the latter are charged to another reaction zone under pressure where the charge along with an added quantity of hydrogen are heated to a higher temperature than present in the first zone so as to hydrocrack the constituents and produce additional quantities of gas and light liquids which are then separated from the heavy bottoms. The gases and light liquids from each stage are selectively segregated in a separation and distillation unit. Two or more reaction zones in series relationship may be employed with the charges being subjected to treatment conditions of successively increasing severity accomplished by successively higher temperatures, pressures or residence times or combinations of these parameters. The heavy bottoms from one or more of the stages may be recycled back to preceding stages if desired. A 50 ton per day SRC unit is currently operational.

U.S. Pat. No. 3,488,279 to Schulman describes the Donor Solvent Process in which coal is hydrogenated to produce liquid products in two stages. The first stage is an initial mild conversion by hydrogen donor extraction followed by a second stage of catalytic hydrogenation using a cobalt molybdate catalyst and added molecular hydrogen. By this sequence, conversion of oxygen to carbon dioxide rather than water is maximized, thus more efficiently using the hydrogen to form hydrocarbon products. The liquid products can be hydrocracked with a catalyst similar to that used in catalytic hydrogenation, and preferably the spent hydrocracking catalyst can be employed in the catalytic hydrogenation stage. A 250 ton per day plant using this process is being constructed.

U.S. Pat. No. 3,540,995 to Wolk and Johanson describes the H-coal process for converting coal to a light crude distillate by hydrogenation in an ebullated catalyst bed reactor. The process is directed to increasing the conversion of coal into hydrocarbons by recycling of slurry oil and controlling the composition, recycle rate and solids content of recycle liquid to the ebullated bed reactor. The largest U.S. Plant utilizing this process (600 ton per day) produces 72,000 gallons per day of naphtha which can be converted to 72,000 gallons of gasoline.

All of the aforementioned processes are plagued with severe corrosion problems due to the corrosive nature of the hot coal liquids and the resultant liquid and gaseous reaction products. This corrosion is aggravated by the high reaction temperatures and pressures employed. Particularly susceptible to this corrosion attack by hot coal liquids and gases are slurry pumps and pressure letdown valves. Extensive research into this problem is being carried out to develop new valve designs and valve materials. The importance in overcoming these problems is highlighted in a recent publication entitled "Inside D.O.E." page 9, McGraw-Hill, Nov. 9, 1979, in which it is noted that valves used in the Donor Solvent process which were made of conventional metals lasted only a few days and even valves made of such exotic material as tungsten carbide have to be replaced every 15 to 30 days. Not only is the replacement of the pressure letdown valves expensive per se but the resulting production down time escalates operating costs. Thus, there is an urgent need to solve problems of corrosion particularly in pressure letdown units before commercial coal liquefaction facilities are built.

U.S. Pat. No. 3,211,135 to Grimes et al relates to a pressure breakdown control system for a once-through high pressure steam generator. This system is said to minimize or eliminate rapid erosion, objectionable vibrations and disturbing noise conditions which are inherent in the start-up and shutdown sequences of this type of steam generating equipment. The Grimes et al system employs one or more pressure reducing tubes that define relatively long flow paths. Nothing in Grimes et al that suggests the use of this type of pressure breakdown means would overcome the significant corrosion problem unique in coal liquefaction or coal gasification environments. The steam present in Grimes et al is not highly corrosive as are the coal liquefaction and gasification products of the present invention. Corrosion is primarily a chemical phenomenon while erosion is primarily a physical phenomenon. In many corrosive environments metal surfaces are protected by the in situ formation of complex metal oxide layers or other protective coatings. This very thin coating, in effect, seals off the metal surface from corrosive attack. In corrosive environments which also entail rapidly moving fluid streams, there is often a deleterious effect to metal surfaces from the combination of chemical corrosion and physical erosion. The rapidly moving fluid stream may erode, by abrasion or scraping, the thin protective coating on the metal surface. The fresh surface is then quickly oxidized again to form a new protective coating. If this process is continuously and rapidly repeated, the metal surface will be worn away as a result of alternate formation and removal of the oxide layer. In the present invention, pressure reduction is effected in such a manner that corrosion is significantly reduced. This is accomplished by limiting the local velocity of the corrosive fluid so that the protective oxide layer is not continuously and aggressively damaged.

BRIEF DESCRIPTION OF THE DRAWING

The FIGURE is a flowsheet of an H-coal liquefaction system incorporating means to substantially reduce corrosion in a pressure reduction zone according to the present invention.

SUMMARY OF THE INVENTION

It is an object of the present invention to provide improved system and process for the liquefaction of coal and similar carbonaceous solids which alleviates the difficulties referred to above and permits the production of liquid and gaseous products more economically than might otherwise be possible.

More, specifically it is an object of the present invention to provide a system and process for the liquefaction of coal which does not exhibit the severe corrosion problems normally associated with pressure letdown valves in this type of environment.

In accordance with these and other objects, the present invention provides a system for the manufacture of synthetic hydrocarbon products from a solid carbonaceous feed, said system comprising: treatment means for converting said solid carbonaceous feed into at least one fluid hydrocarbon stream at an elevated temperature and pressure; product recovery means for recovering a fluid hydrocarbon product at a pressure lower than that of said fluid stream from said treatment means; conduit means in communication relationship with said treatment means and said product recovery means; and reducing means located in said conduit means for reducing the corrosion in said conduit means as said fluid hydrocarbon stream passes therethrough and for reducing the pressure of said stream, said reducing means comprising at least one elongated tube defining a fluid flow passage having a transverse area that is substantially smaller than that of said conduit means at the point where said conduit means is connected to said reducing means, the reduction in pressure being effected substantially entirely by friction of the fluid within said tube, and valve means for isolating the flow of said fluid in said tube without effecting substantial pressure drop of the fluid.

The present invention also contemplates a method for the manufacture of synthetic hydrocarbon products from a solid carbonaceous feed, said method comprising the steps of: introducing a solid carbonaceous feed and a hydrogenation agent into a reaction zone; reacting said carbonaceous feed and said hydrogenation agent at an elevated temperature and pressure in said reaction zone to form at least one high pressure fluid hydrocarbon stream; passing said high pressure fluid hydrocarbon stream through a pressure reducing zone which is not substantially adversely affected by the corrosive nature of said fluid hydrocarbon stream, said pressure reducing zone comprising at least one elongated tube defining a fluid flow passage having a transverse area that is substantially smaller than that of the conduit connecting said reaction zone with said reducing zone, said reduction in pressure being effected substantially entirely by friction of the fluid within said tube, and valve means for isolating the flow of the fluid in said tube without effecting substantial pressure drop in the fluid; and recovering at least one fluid hydrocarbon stream from said reducing zone.

DESCRIPTION OF THE PREFERRED EMBODIMENTS

In accordance with this invention the problem of corrosion from hot coal liquids particularly in pressure letdown valves commonly used in pressure reducing units in coal liquefaction systems is substantially reduced. This is accomplished by replacing the conventional pressure reducing valves with an arrangement of one or more pressure reducing tubes that define relatively long flow paths and have a small bore. This capillary arrangement allows expansion of the fluid into a larger volume thus spreading the pressure drop of the corrosive mixture along the full length of the bore of the tube rather than concentrating it at the valve seat and the adjacent inlet and outlet areas.

While the system of the present invention can employ any of the known coal liquefaction techniques, for clarity the following description will relate primarily to a basic H-coal system shown in the FIGURE.

In the process shown feed coal is introduced into the system at 1 and slurried with a recycle oil 2, to provide an oil-coal slurry 3 of from 1 to 1 to as high as 5 to 1 ratio on a weight basis. This oil-coal slurry is then fed to an upflow type reactor 4. Recycle hydrogen in stream 5 combines with make-up hydrogen in stream 6 and passes to the bottom of the reactor 4 where it flows upwardly through the reactor.

The reactor 4 has three zones, an ebullated catalyst zone 7, a catalyst disengaging liquid zone 8 and a reactor vapor zone 9. The coal entering the bottom of the reactor is hydrogenated to form gas and liquid products in the reaction zone which is operated in the temperature range of 750° to 900° F. and at hydrogen partial pressures of 1000 to 4000 psig. The unconverted coal and ash being smaller in particle size and lighter in density than the catalyst, passes up through the ebullated zone 7 into the catalyst disengaging liquid zone 8 and is withdrawn from the reactor with the reactor liquid effluent stream 10.

Suitable catalysts include cobalt, molybdenum, nickel, iron, and the like deposited on a base of alumina, magnesia, silica and the like. The catalyst is preferably in the form of beads, pellets, lumps, chips or the like having dimensions of about 3 to 14 mesh (Tyler) screen.

The reactor effluent vapor at 9 is withdrawn in stream 11, cooled in condenser 12 and the condensed distillates are removed in stream 13. Hydrogen leaving in stream 14 is enriched by conventional means in hydrogen purification unit 15 and the light hydrocarbon gases are removed in stream 16. Enriched hydrogen may be recycled back to reactor 4 by stream 5.

The liquid reactor effluent containing unconverted coal and ash leaving the high pressure reactor 4 in stream 10 is partially cooled and passed through a pressure reduction means, shown generally at 18, into a flash system 19. The flashed reactor liquid leaving flash system 19 as stream 20 contains residuum and unreacted coal and ash. The solids can be separated out in liquid cyclone 21. Better removal of solids can be effected in a somewhat modified H-coal process employing a rotary drum filter, see Stotler U.S. Pat. No. 3,962,070. A major proportion of the liquid product 22 can be recovered from the cyclone as the net reactor liquid.

Turning with greater detail to the embodiment of the pressure reducing means shown at 18, this unit comprises a first isolation valve 25 in line 10 and a first tubular header 26 which communicates with line 10 and capillary tubes 27. Capillary tubes 27 in turn communicate with a second tubular header 28 which is connected to the recovery portion of the system, i.e., the flash drum and cyclone. Located in capillary tubes 27 are isolation valves 29 and 30.

Each tube establishes communication between the high pressure liquid flow stream from the coal liquefaction reactor and the lower pressure recovery system. While the FIGURE shows the use of headers, the individual tubes can be connected directly to the fluid flow circuitry if desired. The isolation valves serve to place the system, or any part of it, into and out of active service, but they are not subjected to large fluid pressure differentials and high velocity fluid flow. Therefore, the isolation valves may be of any suitable standard type. In the system of the present invention pressure reduction is effected by fluid friction occasioned by the flow within each pressure reducing tube. In this configuration the pressure or energy reduction is distributed over the entire length of the tubes. The net effect is a smooth and gradual transition of the fluid from a high pressure condition to a low pressure condition even where this reduction in pressure results in the formation of two phase fluid streams. Objectionable vibrations and noise due to pressure drops are also eliminated.

The parameters for the pressure reducing capillary tubes, i.e., number, size of bore, length, entrance geometry, surface condition of the bore, material of construction and the like, may vary widely and can be selected to fit the operating characteristics of the unit and the overall economics of the installation. The number of tubes preferably is sufficient to provide reasonable stepwise control of the fluid flow rate as individual tubes are opened or closed sequentially without utilizing too many tubes or excessively long tubes to accomplish the required pressure reduction.

The overall length of the pressure reducing tube should be such that the tubes will provide a relatively high pressure drop per unit length. Once the overall tube length has been chosen it will be appreciated that the selected internal diameter of such tubes when considered in relation to the characteristics of the fluid flowing, i.e., temperature, pressure, etc. and the condition of the interior surface of the tubing, i.e., its degree of smoothness or roughness, determines the fluid velocity, the incremental friction loss per unit tube length and the fluid flow rate.

The term "tubes" in this description, is not limited to conventional pipes or conduits but includes various forms of one-piece or multi-piece devices having suitable passages to permit fluid flow therethrough for the indicated purpose. One such device can consist of a suitable elongated, solid article having a plurality of relatively long, small diameter bores formed therein.

While the invention has been described in what are presently considered to be the preferred embodiments thereof, it is to be understood that changes or modifications can be made in the system described without departing from the spirit or scope of the invention as defined by the appended claims.

I claim:

1. A system for the manufacture of synthetic hydrocarbon products from a solid carbonaceous feed, said system comprising:
    (a) treatment means for converting said solid carbonaceous feed into at least one fluid hydrocarbon stream at an elevated temperature and pressure;
    (b) product recovery means for recovering a fluid hydrocarbon product at a pressure lower than that of said fluid stream coming from said treatment means;
    (c) conduit means in communicating relationship with said treatment means and said product recovery means; and
    (d) reducing means located in said conduit means for reducing the corrosion in said conduit means as said fluid hydrocarbon stream passes therethrough and for reducing the pressure of said stream, said reducing means comprising at least one elongated tube defining a fluid flow passage having a transverse area that is substantially smaller than that of said conduit means at the point where said conduit means is connected to said reducing means, the reduction in pressure being effected substantially entirely be friction of the fluid within said tube, and valve means for isolating the flow of said fluid in said tube without effecting substantial pressure drop of the fluid.

2. The system according to claim 1 wherein said pressure reducing means comprises a plurality of said tubes, each tube communicating at its upstream end with said conduit means and at its downstream end with said product recovery means, and valve means for isolating fluid flow in each tube without effecting substantial pressure drop in the fluid.

3. The system according to claim 1 wherein said reducing means comprises a plurality of said tubes, a header establishing communication between said conduit means and one end of each tube, means establishing communication between the other end of each tube and said product recovery means, and valve means for isolating flow of fluid in each tube without effecting substantial pressure drop in the fluid.

4. The system according to claim 1 wherein said treatment means comprises a high pressure, high temperature reactor and means for supplying a carbonaceous solid feed and a hydrogenation agent to said reactor.

5. The system according to claim 1 wherein said product recovery means comprises a flash unit for separately recovering hydrocarbon gases and liquids.

6. The system according to claim 1 wherein said carbonaceous solid is coal including a source means for said coal.

* * * * *